United States Patent
Caillot et al.

(10) Patent No.: US 9,487,187 B2
(45) Date of Patent: Nov. 8, 2016

(54) WIPER BLADE ASSEMBLY FOR THE WINDOWS OF A MOTOR VEHICLE

(75) Inventors: Gerald Caillot, Le Mesnil Saint Denis (FR); Jean-Michel Jarasson, Elancourt (FR); Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 295 days.

(21) Appl. No.: 12/742,964

(22) PCT Filed: Nov. 18, 2008

(86) PCT No.: PCT/EP2008/065739
§ 371 (c)(1),
(2), (4) Date: Jul. 13, 2010

(87) PCT Pub. No.: WO2009/065821
PCT Pub. Date: May 28, 2009

(65) Prior Publication Data
US 2012/0090123 A1  Apr. 19, 2012

(30) Foreign Application Priority Data
Nov. 19, 2007 (FR) ..................... 07 08115

(51) Int. Cl.
*B60S 1/38* (2006.01)
*B60S 1/46* (2006.01)
*B60S 1/52* (2006.01)

(52) U.S. Cl.
CPC ............... *B60S 1/524* (2013.01); *B60S 1/381* (2013.01); *B60S 1/3881* (2013.01)

(58) Field of Classification Search
CPC ....... B60S 1/381; B60S 1/3881; B60S 1/524
USPC ......... 15/250.04, 250.201, 250.361, 250.451
See application file for complete search history.

(56) References Cited

U.S. PATENT DOCUMENTS 3,296,647 A * 1/1967 Gumbleton ........... B60S 1/3806
                                                   15/250.04
4,517,704 A * 5/1985 Benson ................... B60S 1/524
                                                   15/250.04
4,782,547 A * 11/1988 Mohnach ................... 15/250.04

(Continued)

FOREIGN PATENT DOCUMENTS

DE        103 23 998 A1   12/2004
DE   10 2004 056 835 A1    6/2006

(Continued)

OTHER PUBLICATIONS

International Search Report w/translation from PCT/EP2008/065739 dated Feb. 27, 2009 (6 pages).

*Primary Examiner* — Michael Jennings
(74) *Attorney, Agent, or Firm* — Osha Liang LLP

(57) ABSTRACT

The invention relates to a wiper blade assembly for the windows of a motor vehicle, comprising a longitudinal support (10) intended to receive a pressure application vertebra (20) and a wiper blade (30) and a wiper accessory (40) carrying a device (42a, 42b) for distributing and projecting a washer liquid wherein the accessory is intended to be assembled with the longitudinal support (10).
According to the invention, the longitudinal support (10) comprises means for fixing said accessory (40) on said support.

30 Claims, 8 Drawing Sheets

(56) References Cited

U.S. PATENT DOCUMENTS

| | | | | |
|---|---|---|---|---|
| 5,245,720 A * | 9/1993 | Schon | | 15/250.04 |
| 5,454,134 A * | 10/1995 | Edele et al. | | 15/250.04 |
| 5,819,360 A * | 10/1998 | Fujii | | B60S 1/482 |
| | | | | 15/250.04 |
| 6,836,924 B2 * | 1/2005 | Egan-Walter | | 15/250.04 |
| 7,464,433 B2 * | 12/2008 | Thomar et al. | | 15/250.201 |
| 7,523,520 B2 * | 4/2009 | Breesch | | B60S 1/3806 |
| | | | | 15/250.201 |
| 7,526,832 B2 * | 5/2009 | Matsumoto | | B60S 1/3801 |
| | | | | 15/250.201 |
| 7,543,353 B2 * | 6/2009 | Ko | | 15/250.201 |
| 7,757,337 B2 * | 7/2010 | Harita et al. | | 15/250.04 |
| 7,836,541 B2 * | 11/2010 | Harita | | B60S 1/3801 |
| | | | | 15/250.04 |
| 7,861,363 B2 * | 1/2011 | Moll | | B60S 1/38 |
| | | | | 15/250.201 |
| 8,191,198 B2 * | 6/2012 | Egner-Walter et al. | ... | 15/250.04 |
| 2006/0156529 A1 * | 7/2006 | Thomar | | B60S 1/381 |
| | | | | 29/450 |
| 2008/0034530 A1 * | 2/2008 | Breesch | | B60S 1/3806 |
| | | | | 15/250.201 |
| 2009/0106928 A1 * | 4/2009 | Lee | | 15/250.361 |

FOREIGN PATENT DOCUMENTS

| | | | | |
|---|---|---|---|---|
| DE | 10 2006 013 900 A1 | 9/2007 | | |
| FR | 2 648 771 A1 | 12/1990 | | |
| WO | WO 2006056406 A1 * | 6/2006 | | B60S 1/40 |
| WO | 2007/000346 A1 | 1/2007 | | |
| WO | WO 2007110177 A1 * | 10/2007 | | B60S 1/3862 |

* cited by examiner

WIPER BLADE ASSEMBLY FOR THE WINDOWS OF A MOTOR VEHICLE

The present invention relates to a wiper blade assembly for the windows of a motor vehicle.

The invention also relates to an accessory for a wiper blade assembly and a wiper device for the windows of a motor vehicle integrating such a wiper blade assembly.

A technology of wiper blade assemblies for the windows of motor vehicles also known as "flat blade" currently exists, and an example of embodiment is described in the international application No WO2007/000346.

Such "flat blade" technology consists of a structure built around a solid longitudinal part composed of two functionally distinct portions.

A first portion is a semi-rigid and flexible plastic material support including on the one hand, a cavity wherein a pressure application rod, generally metallic and also called "vertebra" is accommodated and on the other hand a clip carrying the elastomer wiper blade.

A second portion of said solid longitudinal part is an accessory intended to improve the quality of the wiping. A first type of accessory is, for example, a wind deflector which uses the relative wind of the vehicle to increase the contact force of the wiper blade against the glass surface to be wiped. Another type of accessory may be a device for projecting an appropriate washer liquid which makes it possible, through the combined action with the wiping motion of the wiper blade, to eliminate some solid particles which can get fixed on the windows such as mud projections or residues of insects crushed against the windshield.

The above mentioned international application illustrates a wiper blade assembly related to the "flat blade" technology, the accessory of which combines a wind deflector with a liquid projecting device.

At present, the complex longitudinal part integrating the functions of a support and an accessory is obtained through the co-extrusion of at least two materials. A first material is a semi-rigid plastic material intended to carry out the support function proper, wherein at least another material, such as an elastomer, is used to carry out at least the accessory function: wind deflection and/or liquid projection, or any other function.

However, this structure known as the "flat blade" has many drawbacks.

First, it should be noted that the solid longitudinal part used both as a support and as an accessory is difficult to manufacture through the co-extrusion of different materials having a complex profile. In addition, the rigidity of the "wiper blade assembly" thus obtained is increased because of the addition to the support proper of material required for performing the desired accessory functions. This drawback is even more acute when temperature is low.

On the other hand, in order to insert into the co-extruded structure a connector for the connection to the wiper blade assembly driving mechanism, the part must be cut into two segments which results in the problem of the connection thereof to the connector. The problem of the continuity of the fluid circulation between both segments in the case when longitudinal channels for transporting the washer fluid are integrated in the structure is also raised.

Then, one object of the invention is to provide a wiper blade assembly of the "flat blade" type which would have a simpler production than the currently implemented co-extrusion, and which would avoid the hereabove mentioned difficulties, more particularly as regards the connection of accessory segments together and to the central connector.

This aim is reached according to the invention, thanks to a wiper blade assembly for the windows of a motor vehicle comprising:
  a solid longitudinal support intended to receive a stiffening rod and a wiper blade; and
  a wiper accessory (40) carrying a device for distributing and projecting a washer liquid, said accessory being intended to be assembled to the longitudinal support (10);

The wiper blade assembly according to the invention is remarkable in that the longitudinal support comprises means for fixing said accessory (40) on said support.

Thus, it should be understood that the wiper blade assembly according to the invention is organized around a central part i.e. the longitudinal support which is used for receiving not only the stiffening rod or "vertebra" and the wiper blade, but also an accessory, for example a wind deflector provided with a device for distributing and projecting fluid. Within the scope of the invention, the accessory is then a part independent from the support, but which can be assembled and fixed thereto by appropriate means. The invention thus relates to the separation of the functions performed by the only solid complex part known from the above-mentioned international application.

The advantages of the invention are numerous.

Contrarily to the known "flat blade" systems, the support and the accessory may be produced independently from each other, by means of a simple extrusion either of a semi-rigid plastic material for the support, or of an elastomer or a plastic material for the accessory. Each part is thus easier to produce.

On the other hand, the assembly of a wiper blade assembly according to the invention comprising a central connector is extremely simple. In this case, the invention provides that said wiper accessory is composed of two segments positioned on the support, on either side of the central connector. As shown in greater details in the following, it is sufficient to position the connector on the longitudinal support, at the requested place, then to assemble and fix both accessory segments on the support, on either side of the connector.

In addition, this allows a better standardization of the parts, for example through the production of a single support and the adaptation of a given accessory as a function of the wiper blade assembly.

As the accessory comprises a device for distributing and projecting liquid for example produced in the form of a longitudinal channel transporting said liquid, also called a spraying ramp, the invention provides means for connecting the fluid transport channels of said accessory segments. The continuity of the fluid circulation between both accessory segments is thus ensured at the level of the connector by said connecting means which can be one or several rigid tubes inserted at each end into the transportation channels of both segments. In particular, said connection means are carried by said central connector.

It is also provided that the connection means are directly integrated on or fixed to the central connector.

In addition, the flexibility of the wiper blade assembly according to the invention can be easily improved, more particularly when it is cold, because said longitudinal support includes transversal notches. It should be noted that such notches cannot be obtained with the known solid part of the state of the art in which the support is co-extruded with the accessory. As for the aesthetic point of view, the notches in the support are not visible since they are hidden by the accessory once the latter is assembled on the support.

Eventually, the construction in two separate parts, the support and the accessory, of the wiper blade assembly of the invention and the mounting thereof, using their complementary shapes, makes it possible to create a complete range of solutions around the support as the standard central element on which an accessory can be mounted upon request. For example, for front wiper blade assemblies, a wind deflector having a certain shape may be selected as an accessory. For rear window wiper blade assemblies, the same standard support as that of front wiper blade assemblies may receive, as an accessory, a wind deflector having another shape more adapted to the rear windows.

Numerous methods for fixing the wiper accessory on the longitudinal support may be considered.

In a very general way, the accessory is fixed to the support, using their complementary shapes.

According to a first embodiment, said fixing means are means for clipping said accessory on said support.

According to a second embodiment, said fixing means are articulated longitudinal lugs provided on said accessory, able to be inserted into outer slides provided on said support.

According to a third embodiment, said fixing means are means for retaining said accessory in slides provided on said support. Among the possible retaining means, it should be noted that it is possible to use a notch/protrusion cooperation.

According to a fourth embodiment, said fixing means include at least a side hook positioned on said accessory and able to be clamped said support.

According to a fifth embodiment, said fixing means are composed of a longitudinal rib provided on said support and having a retaining profile capable of cooperating with the retaining profile combined with a longitudinal groove provided in said accessory.

The following description, together with the appended drawings given as non limitative examples will help understanding the invention and the embodiment thereof.

FIG. 1b is a cross-sectional view illustrating a mounting of the system of FIG. 1a.

FIG. 5a is a cross-sectional view of an alternative wiper blade assembly of FIG. 4a.

FIG. 5b is a perspective view of a possible mounting of a wiper blade assembly according to FIG. 5a.

FIGS. 5c and 5d are cross-sectional views of alternatives of the wiper blade assembly of FIG. 5a.

Figure 1A:
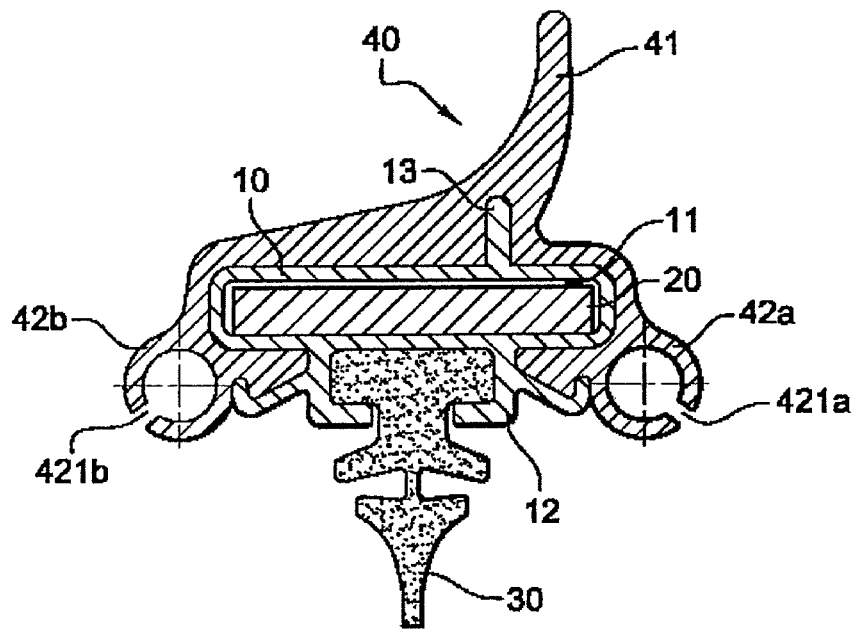
FIG. 1a is a cross-sectional view of a wiper blade assembly according to the invention.

FIG. 1a shows a cross-sectional view of a wiper blade assembly for the windows of motor vehicles comprising a longitudinal support 10 made of some extruded semi-rigid plastic material. Such support 10 includes, as per the "flat blade" technology, a cavity 11 intended to accommodate a pressure application metallic rod 20 or "vertebra", having a plane shape and substantially extending on the whole length of the wiper blade assembly. The support 10 also includes a longitudinal clip 12 into which an elastomer wiper blade 30 is introduced.

As shown in FIG. 1a, an accessory 40 is assembled, and fixed to the longitudinal support 10 and produced by extrusion, independently from the support 10. In the example of FIG. 1a, the accessory 40 is a wind deflector 41 comprising a device 42 for distributing and projecting fluid composed of two longitudinal channels 42a, 42b provided with holes 421a, 421b in order to allow the projection of a washer liquid for example onto the window of a vehicle. The longitudinal channels 42a, 42b are also called spraying ramps.

The accessory 40 of FIG. 1a is composed of only one material, here an extruded elastomer. In a general way, the wiper accessory 40 is obtained by extruding at least one elastomer and at least one plastic material.

Figure 1B:
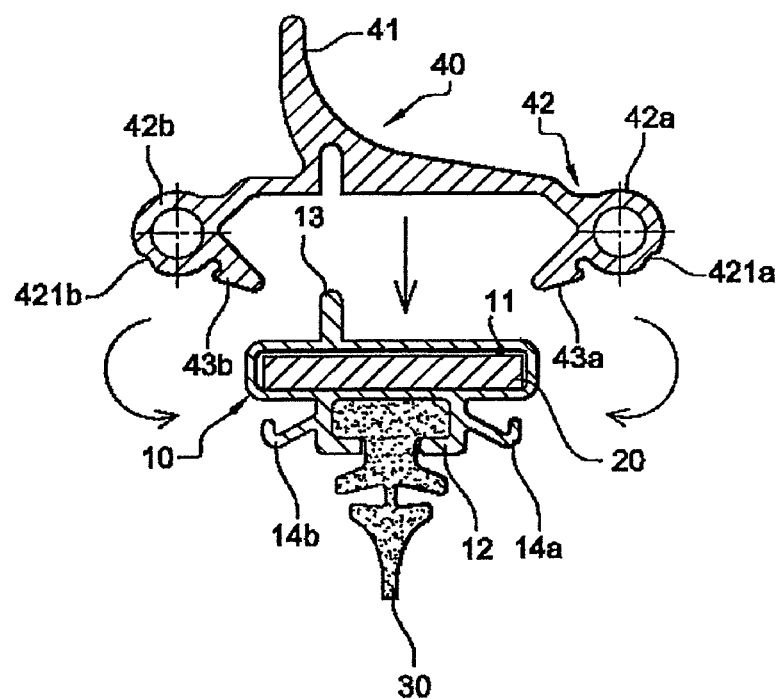

FIG. 1b shows a particular method for assembling and fixing the accessory 40 onto the longitudinal support 10. As shown in the Figure, the accessory 40 is placed above the support 10, then the flanks of the accessory carrying the channels 42a, 42b are elastically separated, so as to vertically assemble both parts 10 and 40 one above the other. The flanks are then released, with the accessory 40 being fixed on the support 10 through the clipping of elements 43a, 43b for fixing the accessory 40 into combined elements 14a, 14b of the support 10.

Figure 2:
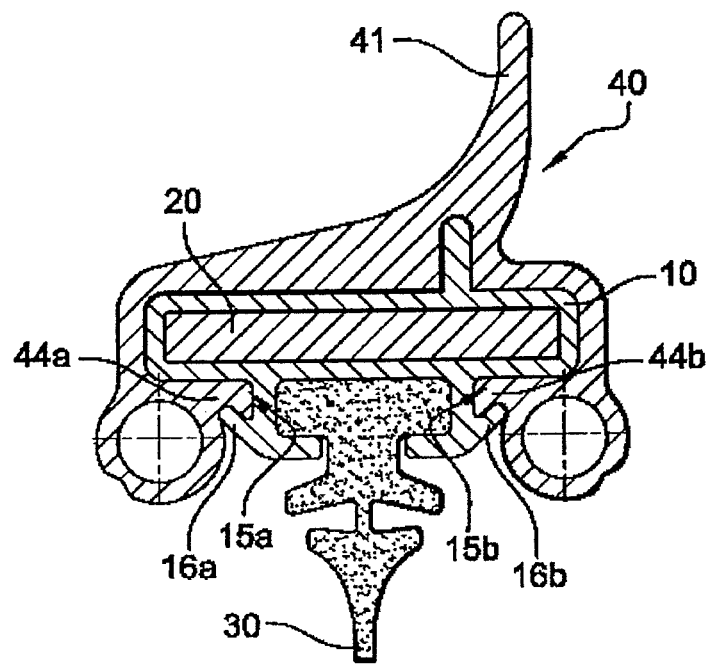
FIG. 2 is a cross-sectional view of an alternative embodiment of the wiper blade assembly of FIGS. 1a and 1b.

FIG. 2 shows a wiper blade assembly similar to that of FIGS. 1b and 1a. In the case of FIG. 2, the assembly is obtained by sliding the accessory 40 along the support using the slides 15a, 15b provided in the support 10, the fixing of both parts being provided by combined retaining means 16a, 16b and 44a, 44b respectively provided on the support 10 and the accessory 40.

Figure 3:
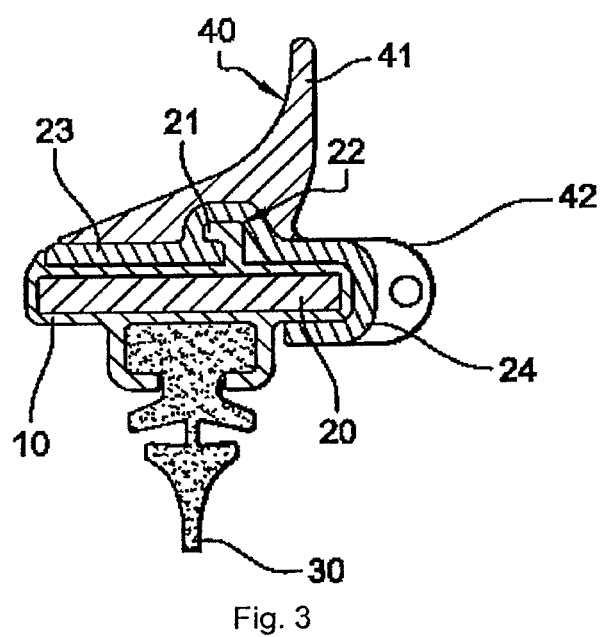
FIG. 3 is a cross-sectional view of an alternative embodiment of the wiper blade assembly according to the invention.

FIG. 3 is an alternative embodiment of the wiper blade assembly of FIG. 1a which comprises a longitudinal support 10 which an accessory 40 is assembled and fixed on. The accessory 40, as previously mentioned, is obtained by extrusion, independently from the support 10. The accessory 40 is a wind deflector 41 comprising a device 42 for distributing and projecting fluid. In the present case, the device for distributing and projecting fluid has only one longitudinal channel 42 allowing the transport along a wiper blade assembly and the projection of a washer liquid for example onto the window of a motor vehicle.

The support 10 has, in the centre thereof in FIG. 3, a longitudinal hook 21. The hook 21 is able to be received in a recess 22 having a shape complementary to the hook 21 which is mounted on the accessory 40.

As can be seen in FIG. 3, the recess 22 is provided in a portion 23 of the accessory 40 opposite the deflector 41. This portion 23 is also called the base, since it is the base of the deflector 41 and the rigidity thereof is different from that of the whole deflector. Preferably, the base 23 will have a greater rigidity to provide a better holding of the accessory 40 on the support 10.

Thus, the hook 21/recess 22 cooperation and the presence of the base 23 having a greater rigidity allow a secure holding of the accessory 40 on the support 10 when the accessory 40 is mounted on the support 10.

The base 23 is, for example, produced by co-extrusion on the deflector 41 to form the accessory 40.

It should be noted that the base 23 also has a side hook 24 capable of being clamped on said support and allowing the accessory 40 to be fixed on the support 10.

In the example shown, the side hook 24 carries the device 42 for distributing and projecting liquid.

Figure 4A:
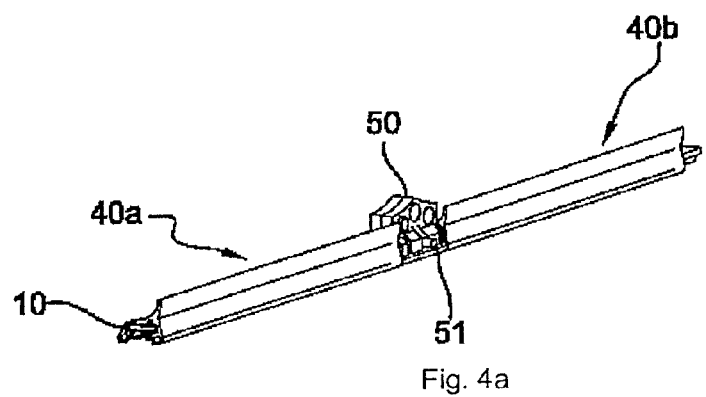
FIG. 4a is a partial perspective view of a wiper blade assembly according to the invention.
Figure 4B:
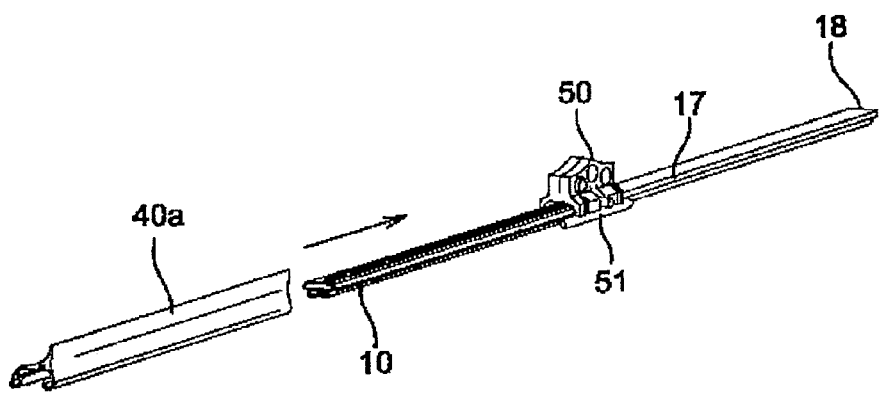
FIG. 4b is a perspective view of the longitudinal support of the wiper blade assembly of FIG. 4a prior to the mounting of the accessory.
Figure 4C:
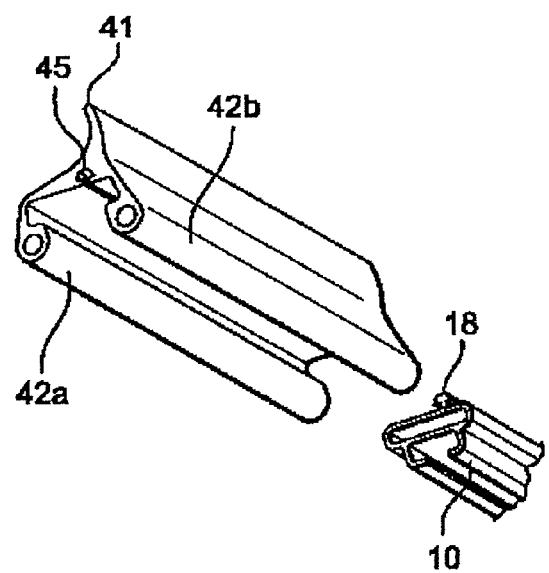
FIG. 4c is a perspective detailed view of the means for fixing the wiper blade accessory of FIG. 4a on the longitudinal support of FIG. 4b.
Figure 4D:
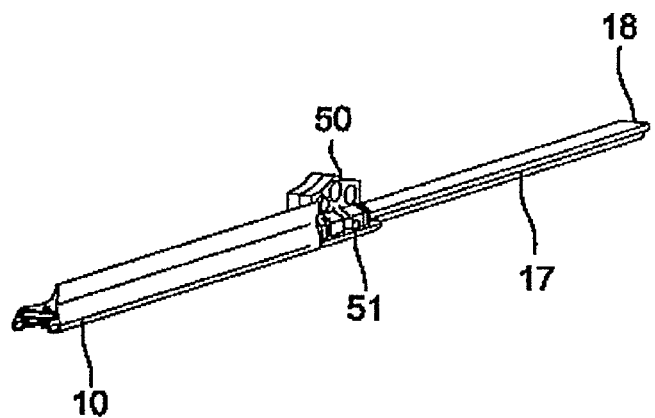
FIG. 4d is a perspective view illustrating a mounting of the wiper blade assembly of FIG. 4a after the mounting of an accessory portion.

FIGS. 4a and 4d show an alternative embodiment of the invention and a principle for mounting the wiper blade assembly.

FIG. 4a shows a general view of a wiper blade assembly comprising a central connector 50 enabling the connection with the wiper blade assembly driving mechanism. As shown in FIG. 4a, in this case, the accessory 40 is composed of two segments 40a, 40b positioned on the support 10 on either side of the central connector 50.

FIG. 4b shows a longitudinal support 10 provided with a plurality of transversal grooves 17 in order to increase the flexibility thereof. The transversal grooves 17 may be implemented on all the supports having different profiles shown in this description.

This figure also makes is possible to see the mounting on the segment 40a onto the support 10.

FIG. 4c is a detailed view showing how each segment 40a, 40b of the accessory 40 may be fixed on the support 10. The fixing means illustrated therein are composed, on the support 10, of a longitudinal rib 18 having a dovetail-shaped retaining profile and on the accessory 40, of a longitudinal groove 45 having a combined retaining profile, having a dovetail shape, too. Thus, as can be seen in FIG. 4d, each segment 40a, 40b of the accessory is mounted on the support 10 through the sliding of the rib 18 into the groove 45, the fixing being obtained through the cooperation of the combined dovetail-shaped profiles, or of any other known holding profile. These complementary shapes of the rib 18 and the groove 45 give a correct fitting between the accessory 40 and the support 10.

It should be noted that the presence of the rib 18 does not affect the flexibility obtained through the transversal grooves 17 provided in the support 10.

In an exemplary embodiment 4a to 4d, the segments 40a, 40b in FIG. 4a show at least one longitudinal channel for transporting the fluid. In FIG. 4c, two longitudinal channels 42a, 42b for transporting the fluid can be seen.

Since the accessory is embodied in the form of segments 40a, 40b, it is necessary to connect the homolog channels of each segment, in order to provide the continuity of circulation of the fluid along the whole washing system. This requirement is met in FIGS. 4a to 4d using tubes 51 carried by the central connector 50 and positioned on either side of the connector, while being aligned with the fluid transport channels. During the mounting operation, it is sufficient to insert the ends of each tube 51 into the corresponding channels.

Figure 5A:
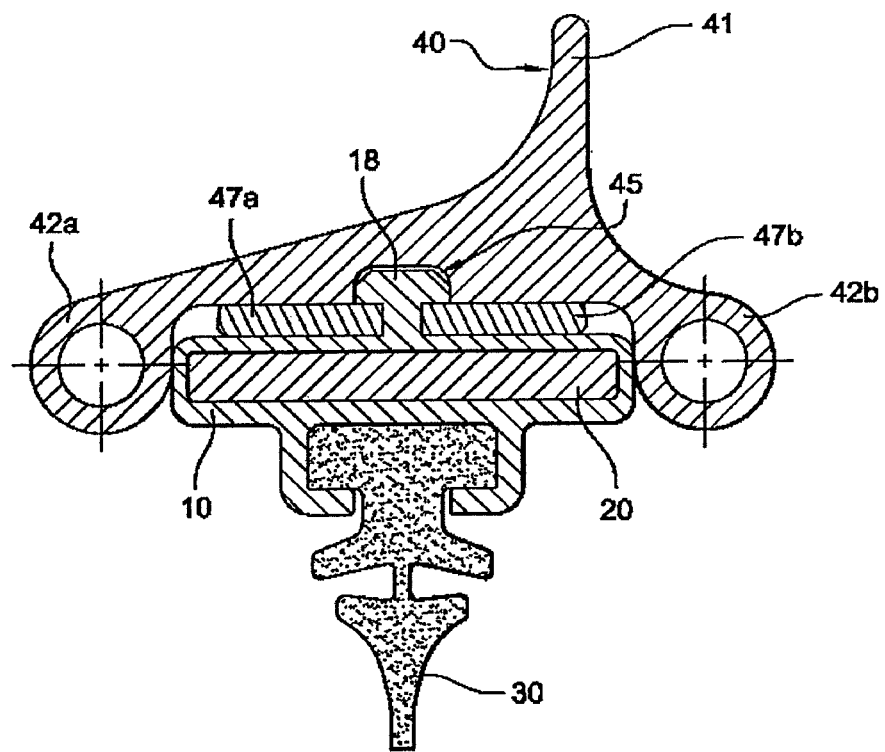
Figure 5B:
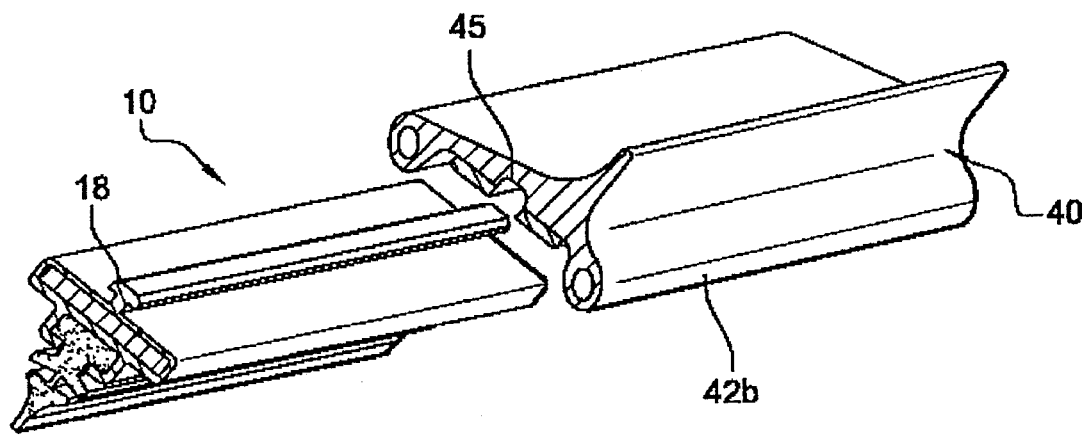
Figure 5C:
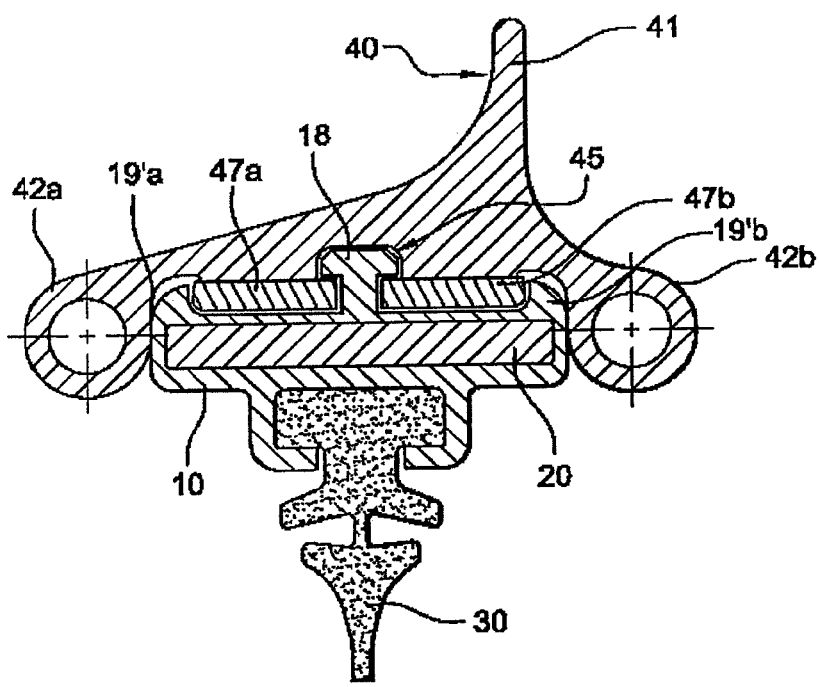

FIGS. 5a to 5c are alternative embodiments of the wiper blade assembly of FIGS. 4a to 4d with a longitudinal rib 18 and groove 45.

As can be seen in FIGS. 5a to 5c, the accessory 40 carrying the device for distributing and transporting the liquid is fixed on the support 10 using two longitudinal lugs 47a, 47b made of co-extruded plastic material, co-extruded with the deflector 41, which can also be made of plastic material.

In the alternative embodiment of FIG. 5a, the longitudinal lugs 47a, 47b generate a clamping stress against the rib 18 which makes it possible to improve the mechanical resistance of the accessory 40 on the support 10.

FIG. 5b offers the possibility of mounting the accessory 40 onto the support 10 according to the longitudinal insertion motion.

In the alternative embodiment of FIG. 5c, the longitudinal lugs 47a, 47b cooperate with the side rims 19'a, 19'b respectively.

Figure 5D:
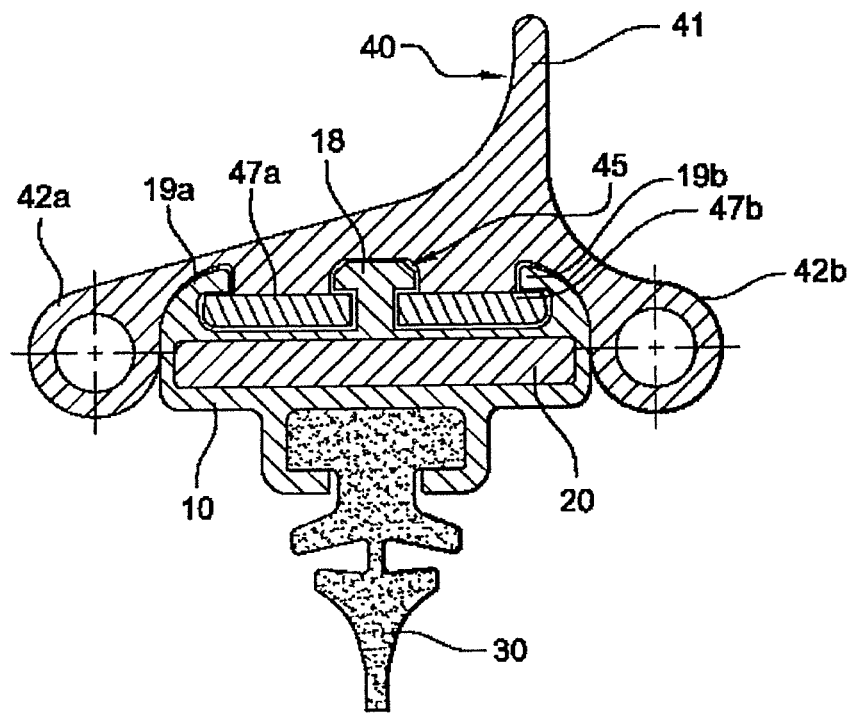

In the alternative embodiment of FIG. 5d, the lugs 47a, 47b are respectively inserted into the external slides 19a, 19b provided on the support 10. Thanks to the elastic structure of the deflector 41, the whole system is stressed inside the slides 19a, 19b.

Thus, in the case of FIGS. 5c and 5d, it is not necessary to create the clamping of the longitudinal lugs against the rib 18.

Figure 6:
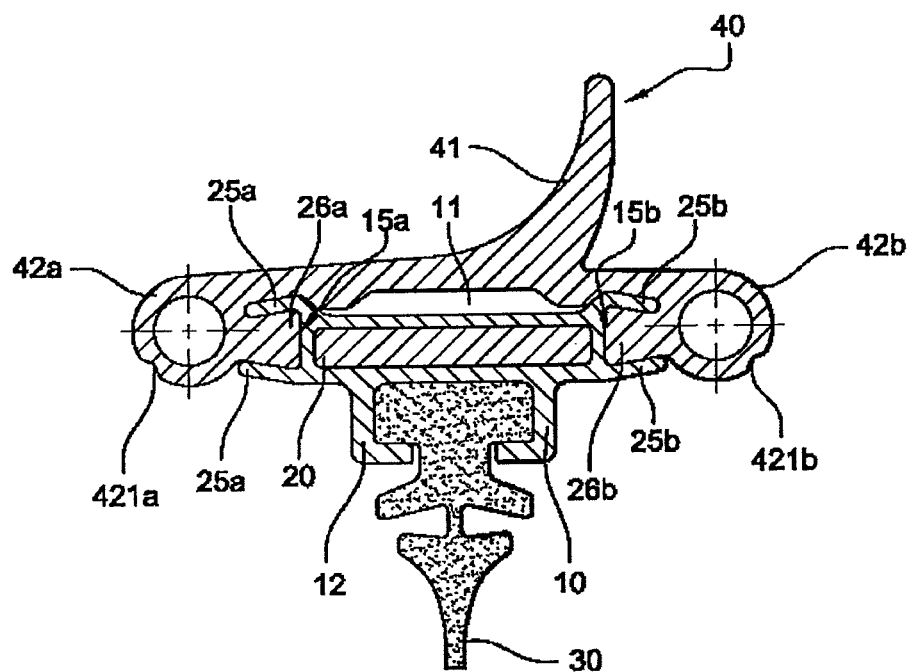
FIG. 6 is a cross-sectional view of another alternative of the wiper blade assembly according to the invention.

FIG. 6 shows an alternative embodiment of the wiper blade assembly of FIG. 2. The structure elements of the wiper blade assembly can be seen, i.e. a longitudinal support 10 made of an extruded semi-rigid plastic material including a cavity 11 intended to accommodate a pressure application metallic rod 20, also called "a vertebra", having a plane shape and substantially extending on the whole length of the wiper blade assembly as well as the longitudinal clip 12 in which an elastomer wiper blade 30 is introduced.

The wiper blade assembly also includes an accessory intended to be assembled and fixed onto the longitudinal support 10.

As previously described, the accessory 40 is obtained by extrusion, independently from the support 10. In the present case, the accessory 40 is a wind deflector 41 including a device 42 for distributing and projecting fluid composed of two longitudinal channels 42a, 42b provided with holes 421a, 421b in order to allow the projection of a washer liquid, for example onto the window of a motor vehicle. The longitudinal channels 42a, 42b are also called spraying ramps. In the present case, the profiles described have two channels for transporting liquid but it should be understood that only one channel may also be appropriate for obtaining the desired function.

According to the invention, the support 10 includes means 15a, 15b forming slides. In the present case, the means forming slides 15a, 15b include, each, two lugs 25a, 25b forming a recess for the lugs 26a, 26b belonging to the accessory 40.

The lugs 26a and 26b extend longitudinally on the support 10 and are positioned on the side edges thereof.

The spigots 26a and 26b are positioned on the accessory 40 to be slidingly mounted between the lugs 25a and 25b so as to be held between the latter.

Thus, the fixing of the two parts is provided by means 25a, 25b (lugs) and 26a, 26b (spigots) forming combined retaining means, respectively provided on the support 10 and the accessory 40.

Figure 7:
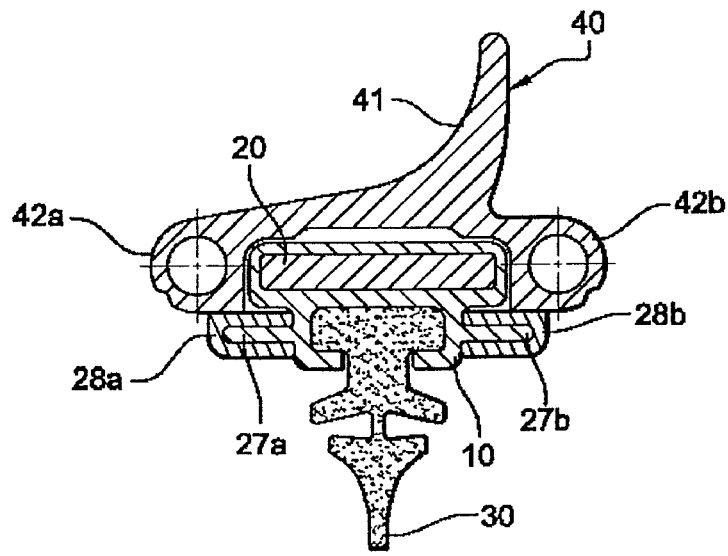
FIG. 7 is a cross-sectional view of another alternative of the wiper blade assembly according to the invention.

FIG. 7 is another alternative of the invention wherein the support 10 has, on the longitudinal edges thereof, at the level of the longitudinal clip 12 wherein a wiper blade 30 is introduced, two protrusion 27a, 27b. Such protrusions are made integral with the support 10 and extend longitudinally on the whole length of the support.

Such protrusions 27a, 27b are intended to be mounted by a longitudinal sliding into notches 28a, 28b provided on the low portion of the accessory 40 and extending longitudinally on the whole length on the accessory 40.

The notches 28*a* and 28*b* are made of plastic material and obtained by co-extrusion of the deflector 41 which can also be made of plastic material. To provide for a better resistance of the protrusion 27*a*, 27*b* in the notches 28*a*, 28*b*, the notches will preferably be made in a material more rigid than the deflector 41.

Providing the notches in the lower area of the accessory makes it possible to prevent any interference with the deflector 41. As a matter of fact it is an advantage since it makes it possible to use already existing deflector shapes.

Figure 8:
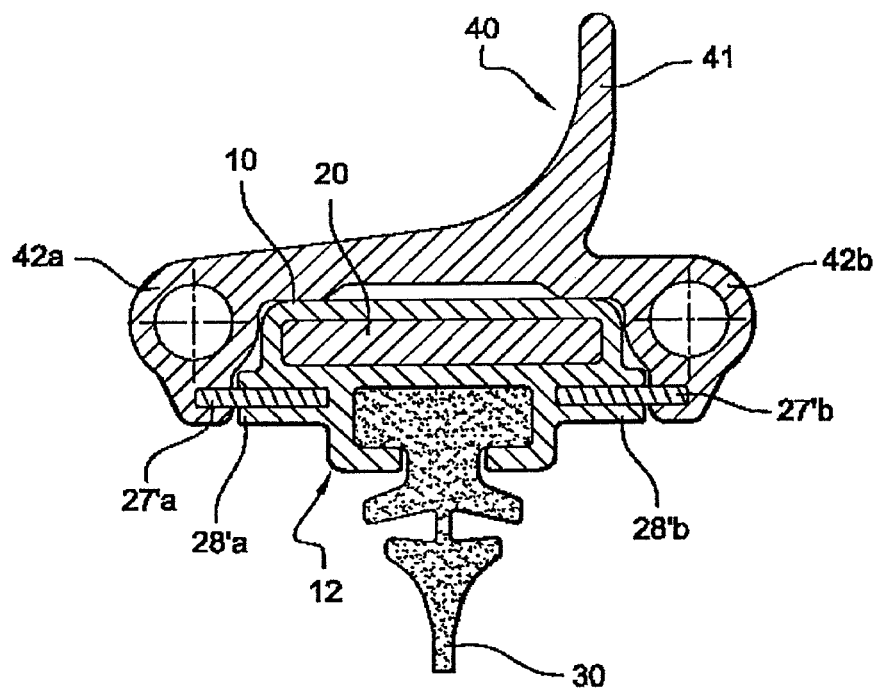
FIG. 8 is a cross-sectional view of an alternative wiper blade assembly of FIG. 7.

FIG. 8 is an alternative embodiment of FIG. 7, wherein a support then carries the notches 28"*a*, 28"*b* and the accessory 40 which carries the protrusions 27'*a*, 27'*b*. The positioning of such elements is similar to that of FIG. 7. As previously mentioned, the protrusions 27'*a*, 27'*b* carried by the accessory 40 are co-extruded with the accessory proper.

Figure 9:
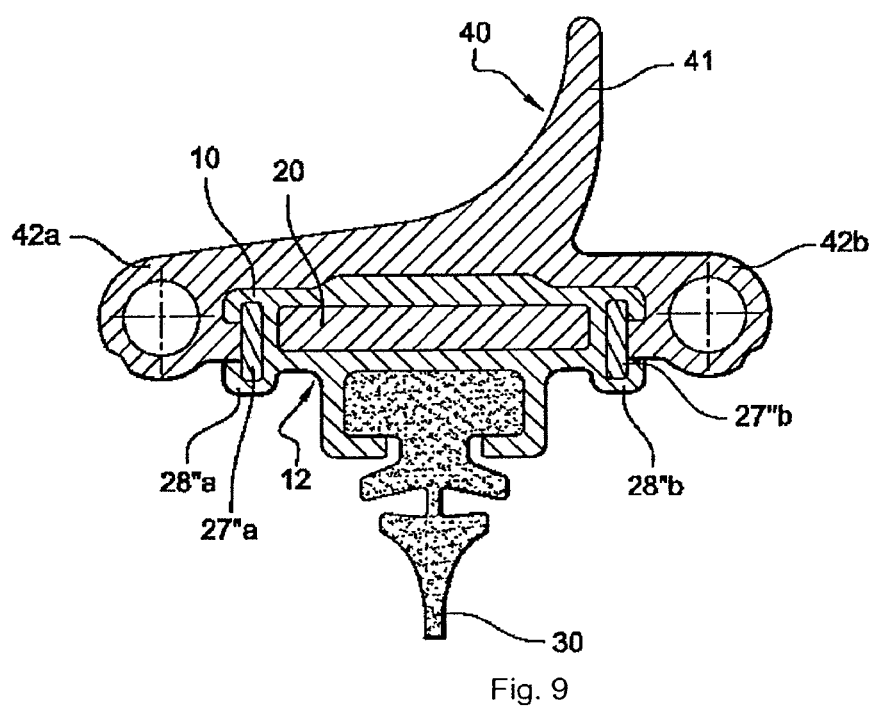
FIG. 9 is a cross-sectional view of another alternative of the wiper blade assembly of FIG. 7.

FIG. 9 is an alternative embodiment of FIG. 8 wherein the support carries the notches 28"*a*, 28"*b*, but the latter are positioned along a different orientation at the level of the cross-sectional view, with respect to the notches on the support in FIG. 8. As a matter of fact, in FIG. 9, the notches 28"*a* and 28"*b* are oriented vertically with respect to those in FIG. 8.

Similarly, the accessory 40 has protrusions 27"*c*, 27"*b* positioned according to a different orientation at the level of the cross-sectional view, with respect to the protrusions of the accessory in FIG. 8. In the present case, in FIG. 9, the protrusions are positioned according to a vertical orientation.

As previously mentioned, the protrusions 27"*a*, 27"*b* are co-extruded with the deflector 41 forming the accessory 40.

The description of the examples hereabove made it possible to show, using some particular non limitative examples, how it is possible to provide a wide range of wiper blade assemblies of the "flat blade" type, while associating various materials and in a secure way, the same support 10 with an accessory 40 having a device for distributing and projecting liquid while obtaining the same results as with a wiper blade assembly for front (a) windows as well as rear (b) windows.

The invention claimed is:

1. A wiper blade assembly for the windows of a motor vehicle comprising:
    a longitudinal support configured to receive a pressure application vertebra and a wiper blade, said longitudinal support having transversal notches formed thereon and a pair of combined elements that protrudes from the longitudinal support; and
    a wiper accessory comprising two segments, each segment carrying a device for distributing and projecting a washer liquid,
    wherein said accessory is configured to be assembled with the pair of combined elements of the longitudinal support, and
    wherein the two segments are separated along a longitudinal axis of the longitudinal support by a central connector.

2. The wiper blade assembly according to claim 1, wherein said accessory includes a wind deflector.

3. The wiper blade assembly according to claim 2, wherein said support includes a longitudinal rib for stiffening said wind deflector.

4. The wiper blade assembly according to claim 1, wherein said device for distributing and projecting the liquid comprises at least one spraying longitudinal channel.

5. The wiper blade assembly according to claim 1, wherein the longitudinal support comprises an interlocking structure that fixes said accessory on said support, and wherein said interlocking structure is arranged on the accessory and on said support and cooperates through a complementary shape thereof.

6. The wiper blade assembly according to claim 5, wherein said interlocking structure retains said accessory in slides provided on said support.

7. The wiper blade assembly according to claim 6, wherein the interlocking structure includes at least one protrusion configured to cooperate with at least one notch.

8. The wiper blade assembly according to claim 6 wherein the interlocking structure positioned on the accessory is made by co-extrusion with the accessory.

9. The wiper blade assembly according to claim 6, wherein the interlocking structure includes a recess intended to receive a hook.

10. The wiper blade assembly according to claim 5, wherein said interlocking structure includes at least a side hook positioned on said accessory and capable of clamping said support.

11. The wiper blade assembly according to claim 5, wherein the interlocking structure is composed of a longitudinal rib provided on said support having a retaining profile able to cooperate with a combined retaining profile of a longitudinal groove provided in said accessory.

12. The wiper blade assembly according to claim 11, wherein said interlocking structure comprises longitudinal lugs provided on said accessory, configured to be inserted at a level of the longitudinal rib provided on said support.

13. The wiper blade assembly according to claim 12, wherein said longitudinal lugs form clamping lugs against said longitudinal rib.

14. The wiper blade assembly according to claim 12, wherein the longitudinal lugs form retaining lugs able to cooperate with combined holding means provided on said support.

15. The wiper blade assembly according to claim 14, wherein said holding means are side rims.

16. The wiper blade assembly according to claim 14, wherein said holding means are side slides.

17. The wiper blade assembly according to claim 1, wherein the longitudinal support comprises an interlocking structure, and wherein said interlocking structure clips said accessory on said support.

18. The wiper blade assembly according to claim 1, further comprising means for connecting fluid transport channels of said accessory segments.

19. The wiper blade assembly according to claim 18, wherein said connecting means is carried by said central connector.

20. The wiper blade assembly according to claim 1, wherein the longitudinal support is a single component.

21. The wiper blade assembly according to claim 20, wherein the longitudinal support further comprises an interlocking structure that fixes said accessory on said support.

22. The wiper blade assembly according to claim 1, wherein the longitudinal support comprises an interlocking structure that fixes said accessory on said support.

23. The wiper blade assembly according to claim 1, wherein the longitudinal support contacts the wiper blade only at a top portion of the wiper blade.

24. The wiper blade assembly according to claim 1, wherein the wiper accessory carries a first device and a second device for distributing and projecting the washer liquid.

25. The wiper blade assembly according to claim 24, wherein the first device and the second device are symmetrically disposed with respect an axis of the wiper blade.

26. The wiper blade assembly according to claim 1, wherein the transversal notches extend substantially along an entire length of the longitudinal support.

27. The wiper blade assembly according to claim 1, wherein the two segments and the central connector lie on an axis that is substantially parallel to the longitudinal axis.

28. The wiper blade assembly according to claim 1, wherein the two segments do not contact each other.

29. A wiper accessory comprising:
two segments, each segment carrying a device for distributing and projecting a washer liquid,
wherein the wiper accessory is configured to be assembled with a pair of combined elements protruding from a longitudinal support of a wiper blade assembly,
wherein said accessory includes an interlocking structure that fixes said support on said accessory,
wherein the longitudinal support includes transversal notches formed thereon, and
wherein the two segments are separated along a longitudinal axis of the longitudinal support by a central connector.

30. A wiper device, for the windshield of a motor vehicle, comprising:
a wiper blade comprising:
a longitudinal support configured to receive a pressure application vertebra and the wiper blade, said longitudinal support having transversal notches formed thereon and a pair of combined elements that protrudes from the longitudinal support; and
a wiper accessory comprising two segments, each segment carrying a device for distributing and projecting a washer liquid,
wherein the wiper accessory is configured to be assembled with the pair of combined elements of the longitudinal support,
wherein the two segments are separated along a longitudinal axis of the longitudinal support by a central connector,
wherein the longitudinal support is a single component, comprises an interlocking structure that fixes the wiper accessory on the support, and
wherein the interlocking structure is arranged on the accessory and on a protrusion of the longitudinal support substantially perpendicular to the pressure application vertebra and cooperates through a complementary shape thereof.

* * * * *